United States Patent [19]
Ito et al.

[11] Patent Number: 4,822,426
[45] Date of Patent: Apr. 18, 1989

[54] PRIMER COMPOSITION USEFUL FOR APPLICATION TO NON-POLAR ON HIGHLY CRYSTALLINE RESIN SUBSTRATES

[75] Inventors: Kenji Ito; Kaoru Kimura, both of Nagoya, Japan

[73] Assignee: Toagosei Chemical Industry Co., Ltd., Tokyo, Japan

[21] Appl. No.: 930,506

[22] Filed: Nov. 12, 1986

[30] Foreign Application Priority Data

Nov. 14, 1985 [JP] Japan .................................. 60-253701
Jan. 14, 1986 [JP] Japan ..................................... 61-4255
Mar. 28, 1986 [JP] Japan ................................... 61-68628

[51] Int. Cl.$^4$ ........................... C09D 3/48; C08J 5/12; C08J 7/06; C08K 5/56
[52] U.S. Cl. ..................................... 106/189; 106/238; 106/287.24
[58] Field of Search .................... 106/189, 238, 287.24

[56] References Cited

U.S. PATENT DOCUMENTS 3,640,972 2/1972 Bolger et al. ...................... 524/850
3,836,377 9/1974 Delahunty ............................ 526/90

FOREIGN PATENT DOCUMENTS 129069 12/1984 European Pat. Off. .
52-098062 8/1977 Japan .
56-032571 4/1981 Japan .
56-141328 11/1981 Japan .
57-119929 7/1982 Japan .
58-008734 1/1983 Japan .

Primary Examiner—A. Lionel Clingman
Attorney, Agent, or Firm—Cooper & Dunham

[57] ABSTRACT

A primer comprising at least one member selected from organometallic compounds, natural resins and synthetic resins and at least one fluorine-containing compound of a specific type, which is particularly useful in bonding non-polar or highly crystalline substrates together or bonding another material to the resin substrate.

18 Claims, No Drawings

PRIMER COMPOSITION USEFUL FOR APPLICATION TO NON-POLAR ON HIGHLY CRYSTALLINE RESIN SUBSTRATES

BACKGROUND OF THE INVENTION

This invention relates to a primer which is used as such in bonding, painting or printing and particularly, to a primer which is applied to non-polar or highly crystalline resins conventionally considered as difficult to bond, paint or print and which thus makes it possible to bond non-polar or highly crystalline resin substrates together or bond other material to the resin substrate, or paint or print on the surface of the resin substrate easily. The primer can be widely utilized in various fields, including automotive industries and electric appliance industries in which there have been widely utilized polyacetal resins and polyamide-imide resins called engineering plastics.

Non-polar or highly crystalline resins such as polyolefins typical of which are polyethylene, polypropylene, polybutene and polyfluoroethylene, polyethylene terephthalate, polyacetal, polyamide, polyvinylidene chloride, nylons and soft PVC films having large amounts of plasticizers, are materials which are difficult to bond, paint and print. These resin materials are not satisfactorily bonded together or painted or printed by the use of ordinary methods.

To improve these materials or resin substrates in adhesiveness, there has been heretofore proposed a surface treating method which comprises subjecting the substrates, for example, polyethylene or polypropylene, to flame treatment, corona discharge treatment, irradiation treatment or oxidizing treatment with a bichromate, sulfuric acid or the like so as to activate the surface of the substrate, that is, produce polar groups such as a carbonyl group in the surface of the substrates.

In addition, to make a resin such as polyfluoroethylene, which is impossible to oxidize on the surface, improved in adhesiveness, there have been proposed a special chemical treatment such as lithium vapor treatment, heat treatment with an alkali in a helium stream or treatment of metallic sodium with liquid ammonia and a satinizing process using a heat treatment in a solution of p-toluenesulfonic acid, a small amount of clay mineral and an organic solvent.

However, these treating methods need special equipments, are complicated to carry out, are unable to uniformly treat every part of the surface of a substrate having a complicated shape and require great expenses, these being disadvantageous.

Various primers also have been proposed. For example, Japanese Patent Appln. Laid-open Gazettes Nos. 52-98062, 56-141328 and 57-119929 have proposed primers prepared by dissolving a chlorinated polyethylene or chlorinated polypropylene or a fatty acid-modified acrylated alkyd resin in an organic solvent.

According to Japanese Pat. Appln. Laid-open Gazette No. 58-8734, however, the primers so proposed are unsatisfactory in adhesiveness to a paint although they are satisfactory in adhesiveness to a polyolefin substrate, or even if the paint and the polyolefin are satisfactory in adhesion to each other, the adhesiveness therebetween will undesirably decrease due to repetition of the cold/hot cycle.

If highly crystalline resins such as polyacetal resin and polyamide resin can be improved in adhesiveness or they can allow satisfactory coating, painting and printing on the surface thereof, they would be very beneficial to various fields such as automobile industry and electric appliance industry since they have many merits such as excellent physical properties, light weight, rust-proofness and low cost as a substitute for metallic materials.

In attempts to develop a surface treating method which is simple and speedy as compared with the conventional methods, the present inventors made intensive studies and, as a result of their studies, they developed desired primers which enable satisfactory adhesion, coating, painting and printing by using a composition comprising a certain kind of fluorine-containing compound and a specific type of compound as a primer for these purposes. The present invention is based on this development or finding.

SUMMARY OF THE INVENTION

As described above, we have found that when a certain kind of fluorine-containing compound with specific type of compound is used as a primer, highly crystalline resin substrates can be strongly bonded together or can be easily coated or printed on the surface thereof.

It is a main object of this invention to provide a primer which enables satisfactory adhesion, coating, painting and printing.

This object of this invention may be achieved by a primer which comprises at least one fluorine-containing compound of the following structural formulae and at least one member selected from the group consisting of organometallic compounds, natural resins and synthetic resins.

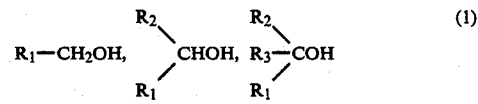

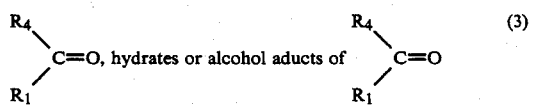

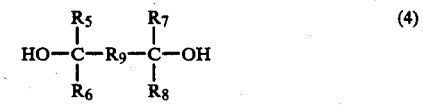

in which each $R_1$ represents a fluorinated alkyl group having from 1 to 12 carbon atoms or a fluorinated aryl group, $R_2$ and $R_3$ independently represent a fluorinated or non-fluorinated alkyl group having from 1 to 12 carbon atoms or a fluorinated or non-fluorinated aryl group, each $R_4$ represents a fluorinated or non-fluorinated alkyl group or an acetonyl group, $R_5$, $R_6$, $R_7$ and $R_8$ may be the same or different from each other and represent a fluorinated alkyl group having from 1 to 4 carbon atoms, and $R_9$ represents a phenylene group, methylphenylene group, dimethylphenylene group, hydroxyphenylene group or naphthylene group.

The methylphenylene group and the dimethylphenylene group used above are ordinarily called tolylene group and xylylene group, respectively.

DETAILED DESCRIPTION OF THE PREFERRED EMBODIMENT

Fluorine-containing compounds

The term "fluorine-containing compounds" used in the present invention is intended to mean those compounds having the above structural formulae which are linear or cyclic hydrocarbons which have a polar group such as a hydroxyl or carbonyl group in the molecule and in which part or all of the hydrogen atoms are substituted with fluorine atoms.

Examples of the compounds include 2,2,2-trifluoroethanol, 2,2,3,3-tetrafluoropropanol, 2,2,3,3,3-pentafluoropropanol, 2,2,3,3,4,4,4-heptafluorobutanol, 2,2,3,3,4,4,5,5,5-nonafluoropentanol, 1,1,1-trifluoroisopropanol, 1,1,1,3,3,3-hexafluoroisopropanol, octafluoro-sec-butanol, perfluoro-tert.-butanol, hexafluoro-tert.-butanol, 2-trifluoromethylpropanol-2, 1-chloro-1,1,3,3,3-pentafluoro-2-propanol, 3,3,4,4,4-pentafluorobutanol-2, 3,3,4,5,5,5-hexafluoro-2-methylpentanol-2, 2,2,3,3,4,4,5,5-octafluoro-1-pentanol, 2,2,3,3,4,4,5,5,6,6,7,7,8,8,8-pentadecafluorooctanol-1, trifluoroacetoaldehyde, trifluoroacetoaldehyde hydrate, pentafluorobenzaldehyde, 2,2,3,3,4,4-hexafluoro-1,5-pentadiol, pentafluorobenzyl alcohol, 1,1,1-trifluoroacetone, hexafluoroacetone, hexafluoroacetone hydrate, trifluoromethyl trichloromethyl ketone, pentafluoroethyl ethyl ketone, pentafluorophenyl methyl ketone, methylheptafluoropropyl ketone, 2-phenyl-hexafluoroisopropanol, hexafluoro-2-(p-tolyl)isopropanol, 1-(pentafluorophenyl)ethanol, decafluorodiphenyl methanol, trifluoroacetaldehydeethyl hemiacetal, heptafluoro-n-butylaldehydeethyl hemiacetal, trifluoroacetaldehydetrifluoroethyl hemiacetal, hexafluoroacetylacetone, sym-dichlorotetrafluoroacetone, sym-dichlorotetrafluoroacetone hydrate, 1,3-bis(2-hydroxyhexafluoroisopropyl)benzene, 1,3-bis(2-hydroxyhexafluoroisopropyl)toluene, 1,3-bis(2-hydroxyhexafluoroisopropyl)xylene, 1,3-bis(2-hydroxyhexafluoroisopropyl)phenol, 1,3-bis(2-hydroxyhexafluoroisopropyl)naphthalene.

Of these, preferable compounds are those which are able to dissolve, swell or disperse organometallic compounds, natural resins or synthetic resins which substantially form a primer layer on materials to be applied with the primer, e.g. on the surface of a highly crystalline resin and which has desirably a suitable degree of volatility. Moreover, it is preferred that they have the capability of infiltration into highly crystalline resin which is the materials to be applied or have solubility of the resin.

Organometallic compounds

The organometallic compounds used in the present invention are compounds in which an organic group and a metal are combined. Such organometallic compounds may be used in the invention irrespective of the kind, structure and the like thereof.

The organic groups contained in the organometallic compounds include alkyl, alkenyl, alkoxy, aryl, acetylacetonyl, acetyloxy, cyclohexyl. In view of the treating effect and the danger, $C_3$ or higher hydrocarbon groups are preferred. The metals contained in the organometallic compounds include, aside from typical metals, transition metals and metalloids indicated in the Periodic Table, phosphorus. The organometallic compounds are those of the following structural formulae.

(1) M—O—R (wherein M is an elemental metal and R an organic group; these definitions apply to the following) which shows metal alcoholates: organoaluminum compounds such as aluminum isopropylate, aluminum mono-sec.-butoxydiisopropylate; organotitanium compounds such as tetrabutyl titanate and tetraisopropyl titanate; organoboron compounds such as tri-n-butyl borate, triphenyl borate, tri-n-octadecyl borate and monobutyldimethyl borate; phosphoric acid esters such as trioleyl phosphate, tridecyl phosphate, dibutyl phosphite, trisisodecyl phosphite, di-2-ethylhexyl phosphite and tridecyl phosphite; tetraoctyl silicate; triisobutoxygallium; and tetrabutyl zirconate.

(2)

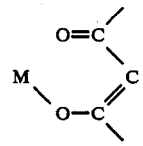

which shows 1,3-dicarbonyl complexes: complex salts of acetylacetonate such as aluminum trisacetylacetonate, aluminum monoacetylacetonate bisethylacetoacetate, aluminum ethylacetoacetate diisopropylate, aluminum trisethylacetoacetate, aluminum oleylacetoacetate diisopropylate; acetylacetone lithium, acetylacetone beryllium, acetylacetone sodium, acetylacetone magnesium, acetylacetone calcium, acetylacetone titanium, acetylacetone strontium, acetylacetone barium, acetylacetone thallium, acetylacetone vanadium, acetylacetone manganese (III), acetylacetone iron (III), acetylacetone thorium, acetylacetone chromium (III), acetylacetone rhodium, acetylacetone cobalt (II), acetylacetone cobalt (III), acetylacetone nickel, acetylacetone copper, acetylacetone zinc, acetylacetone zirconium, acetylacetone palladium, acetylacetone indium, acetylacetone tin (IV) and acetylacetone molybdenum; complex salt of acetoacetic acid ester, trifluoroacetylacetone and benzoylacetone.

(3)

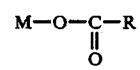

which shows carboxylates: magnesium stearate, aluminum stearate, calcium stearate, ferric stearate, zinc stearate, barium stearate, lead stearate, potassium stearate, copper stearate, manganese stearate, nickel stearate, nickel naphthenate, cobalt naphthenate, manganese naphthenate, magnesium naphthenate, zinc naphthenate, magnesium palmitate, cadmium palmitate, cobalt palmitate, sodium linoleate, sodium laurate, barium oleate, aluminum laurate, aluminum oleate, potassium oleate, aluminum acetate, stannous acetate, stannous 2-ethylhexanoate, aluminum formoacetate, zinc tartrate and basic aluminum thiodiglycolate.

(4) M—R which shows hydrocarbon group-containing metals: alkyl metals such as zinc 2-ethylhexyl, lithium hexadecyl, sodium n-hexyl, potassium hexadecyl, aluminum n-trioctyl, lead n-propylethyl, antimony tri-n-pentyl, antimony tri-n-decyl and zinc isobutylisoamyl; organotin compounds such as dibutyl tin diacetate, di-n-butyl tin diamaleate, di-n-butyl tin dioxide, triphenyl tin acetate, tri-n-butyl tin oxide, dioctyl tin dilaurate, tributyl tin acetate, tributyl tin chloride, tin tetraamyl and diallyl tin dichloride; methylvinyldichlorosilane; octadecyldimethyl[3-(trimethoxysilyl)propyl]ammonium chloride (AY43-U21: tradename of Toray Silicon Co., Ltd.); ferrocene; titanocene dichloride; and nickelocene.

(5) M—X—R (wherein X is a hetero atom) shows other organometallic compounds: metal thioalcoholates such as n-dodecylmercaptopotassium salt and aluminum trithiobutoxide; thiodicarboxylates such as tin 2-ethylhexanemonothioate and zinc 2-ethylhexanedithioate; dithiocarbamates such as nickel dimethyldithiocarbamate, copper dimethyldithiocarbamate, iron dimethyldithiocarbamate and zinc diethyldithiocarbamate; sulfonic acids such as nickel benzenesulfonate; phosphates such as vanadium dibutylphosphate; and zinc 2-mercaptobenzothiazole.

Among these organometallic compounds, the carboxylates (3) and the hydrocarbon group-containing metals (4) are preferred, and the metal alcoholates (1) and the 1,3-dicarbonyl complex salts (2) are more preferred. More particularly, the preferred organometallic compounds include aluminum oleylacetoacetate diisopropylate, aluminum mono-sec.-butoxy diisopropylate, aluminum ethylacetoacetate diisopropylate, aluminum isopropylate, acetylacetone zinc, acetylacetone cobalt, acetylacetone nickel, isopropyl o-titanate, bis(dioctyl pyrophosphate)oxyacetate titanate, bistributyl tin oxide, AY43-021, potassium naphthenate, magnesium naphthenate, cobalt naphthenate, tin octanate. The more preferred organometallic compounds include acetylacetone manganese (III), acetylacetone zirconium, tetrabutyl titanate, isopropyltriisostearoyl titanate, tetraisopropylbis(dioctyl phosphite)titanate, dibutyl tin diacetate, di-2-ethylhexyl tin dilaurate, nickel naphthenate, trisisodecyl phosphite.

Natural or synthetic resins

The natural or synthetic resins (hereinafter referred to simply as synthetic resins) useful in the present invention may be those which are used as resin components in conventional primers. In this connection, however, since a specific type of fluorine-containing compound is used in the present invention as discussed before, the synthetic resin should preferably be readily dissolved, swollen or dispersed in the compound. It is preferred that at least one member selected from rubbers, thermoplastic resins and thermosetting resins (not cured) having a solubility parameter (sp) of not less than 7.0 are used. As a matter of course, the synthetic resin should preferably be selected depending on the kind of substrates such as highly crystalline resin and the kind of adhesive, paint or ink which is applied onto the surface of the substrates.

These synthetic resins may be in the form of liquid, powder, pellet or block. If not dissolved in the fluorine-containing compound, the synthetic resin is uniformly dispersed in the compound. In order to form a primer layer of a uniform thin film on the surface of a substrate, the synthetic resins should preferably be in the form of a liquid or powder. If the powder is used, it should preferably has a size sufficient to pass a 50 mesh screen, more preferably a 100 mesh screen.

Examples of the synthetic resins are those mentioned below, in which the values in parenthesis are sp values.

Liquid polybutadiene (8.4–8.6), liquid NBR (9.4–9.5), polychloroprene (9.2), SBR (8.4–8.7), polyisobutylene (7.8–8.0), polyisoprene (7.9–8.1), butyl rubber (7.7), NBR (9.4–9.5), polysulfide (9.0–9.4), polyurethane (10.0), PVC (9.5), polyvinyl acetate (9.4), polymethacrylate (9.0–9.5), polyethyl acrylate (9.4), polystyrene (9.1), polycarbonate, ethyl cellulose (10.8), cellulose diacetate (10.9), polyacrylonitrile (15.4), polyamide (12.7–13.6), ABS (10.8), AS (12.3), non-cured epoxy resin (9.7–10.9), non-cured phenolic resin (9.6–10.1), non-cured urea resin (9.6–10.1), and non-cured melamine resin (9.6–10.1).

Mixing ratios

The primer effect of the invention is mainly brought about with organometallic compounds and natural or synthetic resins and is satisfactorily shown when these compounds or resins are formed on the surfaces of substrates such as highly crystalline resins or the like in the form of a thin film or a monomolecular layer. Accordingly, the amount of the compound or resin in the primer is preferably from 0.001–10 wt. %, more preferably from 0.001–1 wt. %, of the total amount of the compound or resin and the fluorine-containing compound. Amounts less than 0.001 wt. % are unfavorable because the layer of the compound or resin in the form of a thin film or monomolecular layer is difficult to form, thus making it difficult to show the effect of the primer. Over 10 wt. %, the layer is liable to become too thick and is thus so brittle that the effect of the primer lowers.

Other additives

The primer of the invention is a dispersion or solution of the organometallic compound, or synthetic resins in the fluorine-containing compound and satisfactorily shows the effect as it is. However, organic solvents may be further added in order to improve the coating properties of the primer.

The solvents are preferably those which are able to completely dissolve or disperse the organometallic compound, synthetic resins and the fluorine-containing compound, have a suitable degree of volatility and permit a substrate surface to be wetted.

Examples of the solvent include 1,1,3-trichloro-1,2,2-trifluoroethane, ethanol, acetone, ethyl acetate, 1,1,1-trichloroethane, tetrahydrofuran, 1,4-dioxane, toluene. These solvents may be used singly or in combination.

When these solvents are used in combination, the amount of the organometallic compound, synthetic resins in the primer should preferably be within the above-defined range. The amount of the fluorine-containing compound below 20 wt. % should preferably be avoided. If the amount of the compound is below 20 wt. %, the effect of the primer lowers. Presumably, this is because formation of the primer layer of these compounds on the surface of a substrate such as highly crystalline resin is impeded.

Resins to be applied

The primer of the invention may be applied to a diversity of resins but produce satisfactory, intended effects when applied to non-polar or highly crystalline resins.

The highly crystalline resins used herein include the following resins.

Polyacetal, polyamide, polyimide, polyamideimide, polyethylene terephthalate, polybutylene terephthalate, polytetrafluoroethylene, polyvinylidene chloride, polyethlene, polypropylene, polyphenylene sulfide, polysulfone, polyphenylene oxide, polyarylate, polyether keton, and reinforced composite materials of these resins with glass fibers, carbon or fluorine resins.

Adhesives, paints and printing inks

The primer of the invention is used in bonding, coating or printing of resin substrates and particularly, highly crystalline resins. For bonding, coating and printing of a resin on which the primer of the invention has been applied, there can be used a variety of adhesives, coatings and printing inks.

Examples of the adhesive include cyanoacrylate adhesives, epoxy adhesives, polyester adhesives, acrylic adhesives, urethane adhesives, chloroprene adhesives.

A number of paints and printing inks may be applied. They can be classified as follows with respect to vehicle resin components.

Paints and printing inks based on rosin derivatives, nitro cellulose resins, vinyl resins, acrylic resins, polyester resins, polyamide resins, polyurethane resins, phenolic resins, epoxy resins, aminoalkyd resins, melamine resins and UV-curable acryl oligomers. Of these, polyurethane resin-based, epoxy resin-based and alkyd resin-based paints and printing inks are preferred.

In any cases, when thermosetting resins are applied, those resins whose curing temperature is below 90° C. should preferably be applied since a resin substrate has a limited heat resistance.

Manner of use

The primer of the invention comprises an organometallic compound, a synthetic resin, a fluorine-containing compound and, if desired, additives such as a solvent. These ingredients are mixed to uniformly disperse, swell or dissolve the resin in the fluorine-containing compound, thereby obtaining a primer.

For the application of the primer of the invention on the surface of a resin substrate, no specific operation is necessary. The resin substrate may be immersed in a primer or applied with the primer by brushing or spraying.

The resin substrate on which the primer has been applied is dried in air at room temperature by which the solvent is removed, thereby forming a primer layer on the substrate surface.

The resin substrates on which the primer layer according to the invention is formed can be firmly bonded together or bonded to other material by means of the adhesive described before. Likewise, a paint or coating or a printing ink can be applied on the substrate surface by a usual manner, thus permitting easy coating or printing.

The primer layer may be applied with alpha-cyanoacrylate or a diluted solution of alpha-cyanoacrylate in an organic solvent which does not impede the stability of the compound, e.g. toluene or ethyl acetate, by the use of a brush which has been preliminarily treated with an acid. Alternatively, the resin substrate on which the primer layer is formed may be immersed in alpha-cyanoacrylate or its solution and allowed to stand at room temperature to form a thin layer of alpha-cyanoacrylate polymer. Coating, painting or printing on the thus treated layer is preferably for the good adhesion and good finish.

In order to produce a better effect of the primer of the invention, the kind of organometallic compound or synthetic resin, the kind of fluorine-containing compound, the mixing ratio and the amount to be used have to be determined according to the kind of substrates, particularly the kind of highly crystalline resin.

As for the coating amount of the primer, the thickness of the primer greatly influences the effect as will be described hereinafter. It is preferred that the primer be applied in such a way that the amount of the organometallic compound is in the range of from 0.001 to 1 $g/m^2$, preferably from 0.01 to 0.1 $g/m^2$.

Function

The primer of the invention is assumed to develop the effect according to the following mechanism.

The organometallic compound which is one component of the primer of the invention has a polar group and a non-polar group in the molecule thereof and has thus a coupling function. When the primer is applied to a resin substrate, the organometallic compound is firmly bonded to the resin substrate through the non-polar group of the compound, which has been coated in the form of a thin film, by the synergistic effect of a fluorine-containing compound having high affinity for the resin. The polar groups of the organometallic compound are oriented upwardly on the resin surface, so that the resin surface is activated. On the other hand, synthetic resins can strongly bond to the highly crystalline resin by the action of the fluorine-containing compound showing high affinity for the resin, and there is thus formed on the highly crystalline resin surface a thin primer layer which can produce a hydrogen bond and secondary bond between the primer layer and a material to be applied thereto. When an adhesive, paint, coating or printing ink having polar groups is applied to the thus activated resin surface, strong bonding is formed by the secondary bond based on intermolecular attraction and the hydrogen bond.

Accordingly, the strong bonding is considered to be in a maximum when the primer layer is formed as a monomolecular layer or a thin film close to the monomolecular layer. This was experimentally confirmed.

The present invention is more particularly described by way of Examples and Comparative Examples.

EXAMPLE 1 AND COMPARATIVE EXAMPLE 1

(1) Preparation of primers

The following five compositions were prepared as a primer.

A: solution of 0.5% Al-diisopropylate in trifluoroethanol

B: solution of 0.5% acetylacetone manganese (III) in tetrafluoro-1-propanol

C: solution of 0.5% bis-tributyl tin oxide in heptafluoro-1-butanol

D: solution of 0.5% cobalt naphthenate in pentafluoro-1-propanol

E: solution of 0.5% trisisodecyl phosphite in hexafluoro-2-propanol (2) Performance test of the primers Conducted in accordance with JIS K 6861-1977.

Test piece: polyacetal and nylon 6
  25×100×3 mm

Adhesives:
  (a) Aron Alpha No. 201 (cyanoacrylate-based adhesive, produced by Toagosei Chemical Industry Co., Ltd.)
  (b) Bond E set (epoxy resin adhesive of the two-component type, produced by Konishi Co., Ltd.)

(c) Hardlock E-510 (modified acrylic adhesive of the two-component type, produced by Denki Kagaku Kogyo Kabushiki Kaisha).

Each test piece was wiped with a cloth impregnated with each primer and air dried at room temperature for about 5 minutes, followed by applying an adhesive on one side of the test piece and superposing an adhesive-free side of another test piece on the adhesive layer. The superposed pieces were aged under a compressive load of 0.1 kgf/cm$^2$ at room temperature for 24 hours.

The test pieces were subjected to measurement of a peel bond strength at a pulling rate of 20 mm/min. by the use of the Strograph W-type tester.

For comparison, the procedure of Example 1 was repeated except that the primer was not used.

The results are as shown in Table 1 below.

TABLE 1

| | Tensile Shear Strength (Kgf/cm$^2$) Material to be bonded | | | | | |
|---|---|---|---|---|---|---|
| | Polyacetal/polyacetal | | | Nylon 6/nylon 6 | | |
| | Adhesive Primer | | | | | |
| | a | b | c | a | b | c |
| Example 1: | | | | | | |
| A | Rupture of test piece | 21 | 14 | 36 | 29 | 21 |
| B | Rupture of test piece | 29 | 16 | 38 | 27 | 29 |
| C | Rupture of test piece | 24 | 13 | 45 | 31 | 29 |
| D | Rupture of test piece | 23 | 17 | 47 | 35 | 31 |
| E | Rupture of test piece | 27 | 12 | 36 | 30 | 24 |
| Comp. Example 1: | | | | | | |
| No primer used | 7 | 9 | 5 | 6 | 6 | 7 |

EXAMPLE 2 AND COMPARATIVE EXAMPLE 2

(1) Preparation of primers

The following three compositions were prepared as the primer.

F:
  1% ethyl aceetoacetate-Al diisopropylate
  50% hexafluoroacetylacetone
  49% 1,1,2-trichloro-1,2,2-trifluoroethane G:
  1% dibutyl tin deacetate
  50% heptafluoro-n-butylaldehydeethyl hemiacetal
  49% 1,1,1-trichloroethane H:
  1% diethylhexyl tin laurate
  50% 2,2,3,3,4,4,5,5-octafluoro-1-pentanol
  49% 1,4-dioxane (2) Performance test of the primers The general procedure of Example 1 was repeated except that a polyethylene terephthalate film (PET) having a size of 25×100×0.03 mm was used as a test piece. The results are shown in Table 2.

TABLE 2

| | Tensile Shear Strength (Kgf/cm$^2$) Material to be bonded PET/PET | | |
|---|---|---|---|
| | Adhesive Primer | | |
| | a | b | c |
| Example 2: | | | |
| F | Rupture of test piece | 17 | 16 |
| G | Rupture of test piece | 15 | 23 |
| H | Rupture of test piece | 18 | 21 |
| Comp. Example 2: | | | |
| No primer used | 12 | 9 | 10 |

EXAMPLE 3 AND COMPARATIVE EXAMPLE 3

(1) Preparation of primers

The compositions A-H prepared in Examples 1 and 2 were used.

(2) Measurement of bonding strength of coatings

Conducted in accordance with JIS K 5400-1979.

Test pieces: polyacetal, nylon 6
  100×100×3 mm

Paints:
  (a) Nitro cellulose-based lacquer enamel, brown (produced by Kansai Paint Co., Ltd.)
  (b) Acrylic resin-based paint, yellow (produced by Toagosei Chem. Ind. Co., Ltd.)
  (c) Synthetic resin paint, blue (produced by Toa Paint Co., Ltd.)
  (d) Urethane-based paint, two-part type, brown (Chugoku Marine Paints, Ltd.)
  (e) Aronix UV 3607, clear (Toagosei Chem. Ind. Co., Ltd.)

Each test piece was wiped with a cloth impregnated with a primer on the surface thereof and air dried at room temperature for about 5 minutes, followed by coating the wiped surface with a paint an drying at room temperature for 3 days (paint (e) being cured by application of a UV ray from a UV lamp of 80 W×10 cm/2 seconds). The bonding strength of the coating film was measured according to a cross cut test using an adhesive tape. The results are shown in Table 3.

TABLE 3

| | Bonding Strength of Coating (Cross Cut Test Using Adhesive Tape) Material to be bonded | | | | | | | | | |
|---|---|---|---|---|---|---|---|---|---|---|
| | Polyacetal | | | | | Nylon 6 | | | | |
| | Paint Primer | | | | | | | | | |
| | a | b | c | d | e | a | b | c | d | e |
| Example 3: | | | | | | | | | | |
| A | 100/100 | 100/100 | 100/100 | 100/100 | 100/100 | 100/100 | 100/100 | 100/100 | 100/100 | 100/100 |
| B | " | " | " | " | " | " | " | " | " | " |
| C | " | " | " | " | " | " | " | " | " | " |
| D | " | " | " | " | " | " | " | " | " | " |
| E | " | " | " | " | " | " | " | " | " | " |
| F | " | " | " | " | " | " | " | " | " | " |
| G | " | " | " | " | " | " | " | " | " | " |
| H | " | " | " | " | " | " | " | " | " | " |

TABLE 3-continued

| | Bonding Strength of Coating (Cross Cut Test Using Adhesive Tape) Material to be bonded | | | | | | | | | |
|---|---|---|---|---|---|---|---|---|---|---|
| | Polyacetal | | | | | Nylon 6 | | | | |
| | Paint Primer | | | | | | | | | |
| | a | b | c | d | e | a | b | c | d | e |
| Comp. Example 3: | | | | | | | | | | |
| No primer used | 0/100 | 0/100 | 0/100 | 50/100 | 0/100 | 0/100 | 0/100 | 0/100 | 45/100 | 0/100 |

EXAMPLE 4 AND COMPARATIVE EXAMPLE 4

1. Preparation of primers

The following three liquid compositions were prepared.

I: solution of 0.3% acetylacetone manganese (III) in 1,3-bis(2-hydroxyhexafluoroisopropyl)benzene J: solution of 0.3% acetylacetone zirconium in 1,3-bis(2-hydroxyhexafluoroisopropyl)benzene K: solution of 0.3% tetrabutyl titanate in 1,3-bis(2-hydroxyhexafluoroisopropyl)benzene 2. Performance test of the primers The general procedure of Example 1 was repeated using polyacetal as a test piece. The results are shown in Table 4.

TABLE 4

| | Tensile Shear Strength (kgf/cm$^2$) | | |
|---|---|---|---|
| Primer | Aron Alpha No. 201 | Bond E Set | Hard Lock E-510 |
| Example 4: | | | |
| I | Rupture of test piece | 26 | 15 |
| J | Rupture of test piece | 24 | 17 |
| K | Rupture of test piece | 23 | 14 |
| Comp. Example 4: | | | |
| No primer used | 7 | 8 | 6 |

EXAMPLE 5 AND COMPARATIVE EXAMPLE 5

1. Preparation of primers

The following three liquid compositions were prepared as primer.

L: 0.5% isopropyltriisostearoyl titanate 50% 1,3-bis(2-hydroxyhexafluoroisopropyl)toluene 49.5% n-hexane M: 0.5% dibutyl tin diacetate 50% 1,3-bis(2-hydroxyhexafluoroisopropyl)xylene 49.5% n-hexane N: 0.5% di-2-ethylhexyl tin dilaurate 30% 1,3-bis(2-hydroxyhexafluoroisopropyl)phenol 69.5% n-hexane 2. Performance test of the primers The general procedure of Example 1 and Comparative Example 1 was repeated using, as a test piece, a nylon 6 sheet having a size of 25×100×3 mm.

The results are shown in Table 5.

TABLE 5

| | Tensile Shear Strength (kgf/cm$^2$) | | |
|---|---|---|---|
| Primer | Aron Alpha No. 201 | Bond E Set | Hard Lock E-510 |
| Example 5: | | | |
| L | 41 | 32 | 34 |
| M | 43 | 29 | 33 |
| N | 38 | 31 | 35 |
| Comp. Example 5: | | | |

TABLE 5-continued

| | Tensile Shear Strength (kgf/cm$^2$) | | |
|---|---|---|---|
| Primer | Aron Alpha No. 201 | Bond E Set | Hard Lock E-510 |
| No primer used | 8 | 7 | 9 |

EXAMPLE 6 AND COMPARATIVE EXAMPLE 6

1. Preparation of primers

The following two liquid compositions were prepared as primer.

O: 0.5% nickel naphthenate 50% 1,3-bis(2-hydroxyhexafluoroisopropyl)benzene 49.5% 1,1,1-trichloroethane P: 0.5% trisisodecyl phosphite 30% 1,3-bis(2-hydroxyhexafluoroisopropyl)naphthalene 69.5% 1,1,1-trichloroethane 2. Performance test of the primers The general procedure of Example 1 and Comparative Example 1 was repeated using, as a test piece, a polyethylene terephthalate film (25×100×0.03 mm).

The results are shown in Table 6.

TABLE 6

| | Tensile Shear Strength (kgf/cm$^2$) | | |
|---|---|---|---|
| Primer | Aron Alpha No. 201 | Bond E Set | Hard Lock E-510 |
| Example 6: | | | |
| O | Rupture of the film | Rupture of the film | Rupture of the film |
| P | Rupture of the film | Rupture of the film | Rupture of the film |
| Comp. Example 6: | | | |
| No primer used | 11 | 8 | 13 |

EXAMPLE 7 AND COMPARATIVE EXAMPLE 7

1. Preparation of primers

Eight primers prepared in Examples 4–6 were used.

2. Measurement of bonding strength of coatings

Nylon 6 was used as a test piece and the test was conducted in the same manner as in Example 3. The results are shown in Table 7.

TABLE 7

| | Bonding Strength of Coatings | | | | |
|---|---|---|---|---|---|
| Primer | a | b | c | d | e |
| Example 7: | | | | | |
| I | 100/100 | 100/100 | 100/100 | 100/100 | 100/100 |
| J | " | " | " | " | " |
| K | " | " | " | " | " |
| L | " | " | " | " | " |
| M | " | " | " | " | " |
| N | " | " | " | " | " |
| O | " | " | " | " | " |
| P | " | " | " | " | " |
| Comp. | | | | | |

TABLE 7-continued

| Primer | Bonding Strength of Coatings | | | | |
|---|---|---|---|---|---|
| | a | b | c | d | e |
| Example 7: | | | | | |
| No primer | 0/100 | 0/100 | 0/100 | 43/100 | 0/100 |

The general procedure of Example 1 was repeated using polyacetal, nylon 6 and PET (thickness 0.25 mm) as a test piece.

For comparison, the procedure of Example 8 was repeated without treatment with any primers. The results are shown in Table 8.

TABLE 8

| | Tensile Shear Strength (kgf/cm$^2$) | | | | | | | | |
|---|---|---|---|---|---|---|---|---|---|
| | Polyacetal | | | Nylon 6 | | | PET | | |
| Primers | cyano-acrylate | epoxy resin | modified acrylic resin | cyano-acrylate | epoxy resin | modified acrylic resin | cyan-acrylate | epoxy resin | modified acrylic resin |
| Example 8 | | | | | | | | | |
| Q | Rupture | 28 | 16 | 48 | 29 | 21 | Rupture | 21 | 18 |
| R | Rupture | 35 | 24 | 45 | 34 | 23 | Rupture | 18 | 17 |
| S | Rupture | 41 | 27 | 43 | 28 | 22 | Rupture | 17 | 16 |
| T | Rupture | 37 | 25 | 47 | 31 | 24 | Rupture | 20 | 22 |
| U | Rupture | 36 | 22 | Rupture | 27 | 20 | Rupture | 23 | 19 |
| V | Rupture | 31 | 20 | Rupture | 26 | 21 | Rupture | 25 | 20 |
| W | 37 | 29 | 21 | 44 | 33 | 25 | Rupture | 19 | 17 |
| X | Rupture | 38 | 24 | Rupture | 34 | 23 | Rupture | 18 | 16 |
| Y | 47 | 31 | 19 | 43 | 29 | 22 | Rupture | 22 | 21 |
| Z | Rupture | 46 | 23 | Rupture | 36 | 26 | Rupture | 27 | 24 |
| AA | Rupture | 35 | 21 | 43 | 28 | 24 | Rupture | 19 | 17 |
| BB | Rupture | 38 | 26 | 40 | 26 | 22 | Rupture | 18 | 16 |
| Comparative Example 8 | | | | | | | | | |
| No primer used | 7 | 8 | 6 | 7 | 7 | 6 | 12 | 10 | 8 |

Rupture: Rupture of test pieces

EXAMPLE 8 AND COMPARATIVE EXAMPLE 8

1. Preparation of primers

Twelve primers were prepared using the following 12 synthetic resins.
 (1) Liquid polybutadiene rubber (R45-ACR: produced by Idemitsu Petrochemical Co., Ltd.)
 (2) Powdery SBR rubber (Nippol 1072J: produced by Nippon Zeon Co., Ltd.)
 (3) Powdery polybutadiene rubber (Nisso-PB CC-2: produced by Nippon Soda Co, Ltd.)
 (4) Powdery acrylic rubber (AR-32: produced by Nippon Zeon Co., Ltd.)
 (5) Powdery polyurethane rubber (Paraprene 26S: produced by Nippon Polyurethane Industry Co., Ltd.)
 (6) Powdery modified PVC (Aron 321: produced by Toagosei Chem. Ind. Co., Ltd.)
 (7) Powdery AS (Stylac 769: produced by Asahi Chem. Ind. Co., Ltd.)
 (8) Powdery polymethacrylate (Acrykon AC: produced by Mitsubishi Rayon Co., Ltd.)
 (9) Powdery polycarbonate (Yupiron S-2000F: produced by Mitsubishi Gas Chemical Co., Inc.)
 (10) Pellet-like modified nylon (AQ nylon P-70: produced by Toray Ind., Inc.)
 (11) Powdery hydroxypropyl cellulose (HPC-MF-1: Shin-Etsu Chemical Co., Ltd.)
 (12) Powdery epoxy resin FRP (Aron Powder E-30-W48: produced by Toagosei Chem. Ind. Co., Ltd.)

0.02 g of each of the above polymers was dissolved in 9.98 g of 1,1,1,3,3,3-hexafluoro-2-propanol (produced by Tokyo Kasei Ind. Co., Ltd.) to give primers Q, R, S, T, U, V, W, X, Y, Z, AA and BB.

2. Performance test of the primers

EXAMPLE 9 AND COMPARATIVE EXAMPLE 9

1. Preparation of primers

The following 8 compositions were prepared as primer.

CC:

liquid polybutadiene rubber (R45-ACR): 0.03 g
4-fluorobenzotrifluoride (Aldrich Chemical Co., Inc.): 9.97 g

DD:

powdery modified PVC (Aron 321) 0.03 g
trifluoroethanol (Tokyo Kasei Kogyo Co., Ltd.): 9.97 g

EE:

powdery polymethacrylate (Acrykon AC) 0.03 g
1,3-bis(2-hydroxyhexafluoro-2-propyl)benzene (Central Glass Co., Ltd.): 9.97 g

FF:

powdery hydroxypropyl cellulose (HPC-MF-1): 0.03 g
trifluoroethanol: 9.97 g

GG:

powdery modified nylon (AQ nylon): 0.03 g
trifluoroethanol: 9.97 g

HH:

powdery modified nylon (AQ nylon): 0.03 g
trifluoroacetaldehyde ethylhemiacetal (Tokyo Kasei Kogyo Co., Ltd.): 9.97 g

II:

powdery modified nylon (AQ nylon): 0.03 g
pentafluoro-n-butylaldehyde hemiacetal (Tokyo Kasei Kogyo Co., Ltd.): 9.97 g

JJ:

powdery modified nylon (AQ nylon): 0.03 g
2-hydroxyhexafluoro-2-propylbenzene (Central Glass Co., Ltd.): 9.97 g 2. Performance test of primers The test was effected in the same manner as in Example 8. The results are shown in Table 9.

trifluoroethanol: 3.0 g
toluene: 6.95 g

QQ:

powdery polymethacrylate (Acrykon AC): 0.05 g
1,3-bis(2-hydroxyhexafluoro-2-propyl)benzene: 3.0 g
toluene: 6.95 g

TABLE 9

| | Tensile Shear Strength (kgf/cm$^2$) | | | | | | | | |
|---|---|---|---|---|---|---|---|---|---|
| | Polyacetal | | | Nylon 6 | | | PET | | |
| Primers | cyano-acrylate | epoxy resin | modified acrylic resin | cyano-acrylate | epoxy resin | modified acrylic resin | cyano-acrylate | epoxy resin | modified acrylic resin |
| Example 9 | | | | | | | | | |
| CC | 43 | 33 | 21 | 35 | 25 | 16 | Rupture | 17 | 15 |
| DD | 30 | 26 | 19 | 26 | 20 | 15 | 24 | 22 | 19 |
| EE | 36 | 27 | 23 | 29 | 23 | 22 | Rupture | 21 | 16 |
| FF | 41 | 31 | 24 | 31 | 24 | 19 | Rupture | 20 | 18 |
| GG | Rupture | 39 | 28 | 40 | 26 | 23 | Rupture | 25 | 21 |
| HH | 46 | 34 | 26 | 38 | 22 | 22 | Rupture | 23 | 19 |
| II | Rupture | 35 | 24 | 35 | 25 | 21 | Rupture | 22 | 20 |
| JJ | Rupture | 37 | 22 | 37 | 21 | 22 | Rupture | 24 | 22 |
| Comparative Example 9 | | | | | | | | | |
| No primer used | 7 | 8 | 6 | 7 | 7 | 6 | 12 | 10 | 8 |

Rupture: Rupture of test pieces

EXAMPLE 10 AND COMPARATIVE EXAMPLE 10

1. Preparation of primers

The following ten compositions were prepared as primer.

KK:

liquid polybutadiene rubber (R45-ACR): 0.05 g
trifluoroethanol: 3.0 g
1,1,1-trichloroethane: 6.95 g

LL:

powdery SBR rubber (Nippol 1072J): 0.05 g
hexafluoro-2-propanol: 3.0 g
1,1,1-trichloroethane: 6.95 g

MM:

powdery acrylic rubber (AR-32): 0.05 g
hexafluoro-2-propanol: 3.0 g
1,1,1-trichloroethane: 6.95 g

NN:

powdery polybutadiene rubber (Nisso-PBCC-2): 0.05 g
hexafluoro-2-propanol: 3.0 g
1,1,1-trichloroethane: 6.95 g

OO:

powdery polyurethane rubber (Paraprene 26S): 0.05 g
hexafluoro-2-propanol: 3.0 g
1,1,1-trichloroethane: 6.95 g

PP:

powdery modified PVC (Aron 321): 0.05 g

RR:

powdery polycarbonate (Yupiron S-2000F): 0.05 g
hexafluoro-2-propanol: 3.0 g
toluene: 6.95 g

SS:

powdery modified nylon (AQ nylon): 0.05 g
trifluoroethanol: 3.0 g
toluene: 6.95 g

TT:

powder hydroxypropyl cellulose (HPC-MFP): 0.05 g
trifluoroethanol: 3.0 g
toluene: 6.95 g 2. Measurement of the primers The performance of the primers was evaluated by bonding strength of coating according to JIS K 5400-1979 under the following conditions.

Test piece:
Polyacetal 100×100×3 mm
Nylon 6 Ditto

Paint:
Urethane-based two-part paint brown (produced by Chugoku Marine Paints Ltd.)
Nitro cellulose lacquer brown (Kansai Paint Co., Ltd.)
Synthetic resin paint blue (Toa Paint Co., Ltd.)

Each test piece was wiped on the surface thereof with a cloth impregnated with each primer and air dried at room temperature for about 5 minutes, followed by coating a paint on the surface by means of a brush and drying at room temperature for 7 days. The bonding strength of the coating was measured by the use of a cross cut adhesive tape.

The results are shown in Table 10.

TABLE 10

| Primer | Bonding Strength of Coating | | | | | |
|---|---|---|---|---|---|---|
| | Polyacetal | | | Nylon 6 | | |
| | Urethane paint (brown) | Nitro cellulose lacquer (brown) | Synthetic resin lacquer (blue) | Urethane paint (brown) | Nitro cellulose lacquer (brown) | Synthetic resin lacquer (blue) |
| Example 10: | | | | | | |
| KK | 100/100 | 100/100 | 100/100 | 100/100 | 100/100 | 100/100 |
| LL | " | " | " | " | " | " |
| MM | " | " | " | " | " | " |
| NN | " | " | " | " | " | " |
| OO | " | " | " | " | " | " |
| PP | " | " | " | " | " | " |
| QQ | " | " | " | " | " | " |
| RR | " | " | " | " | " | " |
| SS | " | " | " | " | " | " |
| TT | " | " | " | " | " | " |
| Comp. Example 10: | | | | | | |
| No primer used | 48/100 | 0/100 | 0/100 | 44/100 | 0/100 | 100/100 |

Effects of the Invention

The primer of the invention enables one to bond highly crystalline resin substrates together or paint or print on the substrate in a simple, highly efficient and firm manner although such bonding, painting or printing has heretofore been believed to be difficult. Thus, highly crystalline resins or so-called engineering plastics which have a number of merits such as good physical properties, light weight, rust proofing and low cost can be used as a substitute for metal materials and have very great utility in various fields including the automobile industry and electric appliance industry.

What is claimed is:

1. A primer composition comprising a solvent and a mixture consisting essentially of (a) at least one member selected from the group consisting of organometallic compounds, natural resins and synthetic resins and (b) at least one fluorine-containing compound selected from the group consisting of compounds of the following formulae (1) through (4):

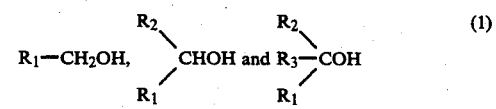

$$R_1-CHO, \text{ and hydrates or alcohol adducts of } R_1-CHO \quad (2)$$

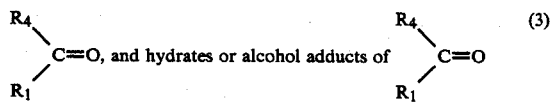

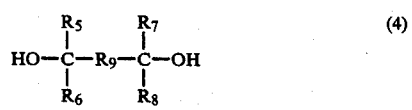

in which each $R_1$ represents a fluorinated alkyl group having from 1 to 12 carbon atoms or a fluorinated aryl group, $R_2$ and $R_3$ independently represent a fluorinated or non-fluorinated alkyl group having from 1 to 12 carbon atoms or a fluorinated or non-fluorinated aryl group, $R_4$ represents a fluorinated or non-fluorinated alkyl group having from 1 to 12 carbon atoms or an acetonyl group, $R_5$, $R_6$, $R_7$ and $R_8$ are the same or different from each other and independently represent a fluorinated alkyl group having from 1 to 4 carbon atoms, and $R_9$ represents a phenylene group, methylphenylene group, dimmthylphenylene group, hydroxyphenylene group or naphthylene group, said fluorine-containing compound possessing a polar group and in which all or part of the hydrogen atoms are substituted with fluorine atoms.

2. A primer composition according to claim 1, wherein at least one said member is an organometallic compound.

3. A primer composition according to claim 2, wherein said organometallic compound is a metal alcoholate of the following formula, M—O—R, in which M is an elemental metal and R is an organic group.

4. A primer composition according to claim 2, wherein said organometallic compound is a 1,3-dicarbonyl complex salt of the following formula,

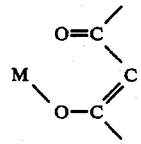

in which M is an elemental metal.

5. A primer composition according to claim 2, wherein said organometallic compound is a carboxylate of the following formula

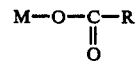

in which M is an elemental metal and R is an organic group.

6. A primer composition according to claim 2, wherein said organometallic compound is a hydrocarbon group-containing metal compound of the formula, M—R, in which M is an elemental metal and R is an organic group.

7. A primer composition according to claim 2, wherein said organometallic compound is of the formula, M—X—R, in which M is an elemental metal, X is a sulfur atom and R is an organic group.

8. A primer composition according to claim 1, wherein at least one said member is a natural resin.

9. A primer composition according to claim 8, wherein said natural resin is in the form of a powder having a size sufficient to pass a 50 mesh screen.

10. A primer composition to claim 1, wherein at least one said member is a synthetic resin.

11. A primer composition according to claim 9, wherein said synthetic resin has a solubility parameter of not less than 7.0.

12. A primer composition according to claim 9, wherein said synthetic resin is in the form of a liquid or a powder having a size sufficient to pass a 50 mesh screen.

13. A primer composition according to claim 1, wherein said mixture is a solution of at least one said member in at least one said fluorine-containing compound.

14. A primer composition according to claim 1, wherein said mixture is a dispersion of at least one said member in at least one said fluorine-containing compound.

15. A primer composition according to claim 13, wherein at least one said member is present in an amount of from 0.001 to 10 wt. % of the total amount of said member and said fluorine-containing compound.

16. A primer composition according to claim 15, wherein said amount is from 0.001 to 1 wt. %.

17. A primer composition according to claim 1, comprising a solvent in an amount which is able to completely dissolve or disperse at least on said member and at least one said fluorine-containing compound.

18. A primer composition according to claim 17, wherein the said fluorine-containing compound is present in an amount not less than 20 wt. % of said composition.

* * * * *